United States Patent [19]

Siegwart

[11] 4,289,161

[45] Sep. 15, 1981

[54] FLUID FLOW REGULATOR

[76] Inventor: Emil Siegwart, Michael-Blatter-Str. 6, D-6603 Sulzbach-Neuweiler, Fed. Rep. of Germany

[21] Appl. No.: 971,562

[22] Filed: Dec. 20, 1978

[30] Foreign Application Priority Data

Dec. 27, 1977 [DE] Fed. Rep. of Germany ....... 2758352

[51] Int. Cl.$^3$ .............................................. G05D 7/01
[52] U.S. Cl. ..................................... 137/499; 137/521
[58] Field of Search ........................ 137/499, 520, 521

[56] References Cited

U.S. PATENT DOCUMENTS

| 7,148 | 5/1876 | Rhamy | 137/521 |
| 3,276,480 | 10/1966 | Kennedy | 137/521 X |
| 3,965,928 | 6/1976 | Siegwart | 137/499 |

*Primary Examiner*—Robert G. Nilson

*Attorney, Agent, or Firm*—Peter K. Kontler

[57] ABSTRACT

A fluid flow regulator wherein a shaft which extends transversely of the passage in a tubular housing carries a flap having two mutually inclined sections. A spring biases the flap to a fully open position and the flap is moved from such open position toward a fully closed position by the fluid which flows through the passage in a direction from the one toward the other axial end of the housing. A flow restricting device is installed in the housing so that it defines one or more channels for the flow of fluid against one or more selected portions of or against the entire flap, depending upon whether the flap extends across the entire passage or across a central portion of the passage. The flow restricting device enhances the sensitivity of the flap so that the latter can change its position in response to each variation of the pressure of fluid which is caused to flow through the housing at a relatively low pressure.

17 Claims, 5 Drawing Figures

FLUID FLOW REGULATOR

BACKGROUND OF THE INVENTION

The present invention relates to improvements in fluid flow regulators of the type wherein a valving element or flap with two mutually inclined sections is pivotably mounted in a tubular housing or duct and is movable by conveyed fluid (e.g., air, another gas or a liquid) from a fully open position to a partly or fully closed position. Fluid flow regulators of such character are disclosed in my U.S. Pat. Nos. 3,965,928, 3,996,961, and 4,124,037 to which reference may be had, if necessary.

Fluid flow regulators which are disclosed in the above-enumerated patents exhibit many important advantages, especially as concerns the ability of the flap to insure the flow of a conveyed fluid medium at a constant rate even if the pressure of conveyed fluid fluctuates within a wide range. Thus, the flap is sufficiently sensitive to react to changes of the pressure of a fluid medium which is caused to flow through the housing at a relatively low pressure. In most instances, the fluid medium which is conveyed through the housing can readily displace the flap against the opposition of a relatively weak spring which tends to maintain the flap in its fully open position.

The diameter of the housing of a fluid flow regulator to which the present invention pertains cannot be reduced below a certain value for a variety of reasons. At the present time, the minimum inner diameter of a cylindrical housing is approximately 80 mm. This can present problems under certain circumstances, for example, when the fluid flow regulator is installed in or associated with a fan which is used for circulation of air in an office or the like. Thus, it is known that a relatively small fan can be placed onto or close to the desk in an office in order to circulate air for the person using the desk. If the inner diameter of the housing of the fluid flow regulator in such fan is in the range of or exceeds 80 mm, the speed at which air must flow through the housing in order to avoid discomfort to the person using the fan is too low to enable the mass of air to invariably maintain the flap in an optimum position. This holds true even if the flap is biased to the fully open position by a very weak spring.

OBJECTS AND SUMMARY OF THE INVENTION

An object of the invention is to provide a novel and improved fluid flow regulator which is constructed and assembled in such a way that its flap is capable of reacting to minute fluctuations of its pressure of a mass of fluid slowly flowing through the housing.

Another object of the invention is to provide a fluid flow regulator of the just outlined character which is much more sensitive than heretofore known regulators and which can be used with advantage for regulation of the rate of flow of gaseous and/or hydraulic fluids.

A further object of the invention is to provide a fluid flow regulator which exhibits all features and advantages of heretofore known fluid flow regulators whose sensitivity is increased in a simple and inexpensive way.

An additional object of the invention is to provide the improved fluid flow regulator with novel means for controlling the flow of conveyed fluid upstream of and in the region of the flap.

The invention is embodied in a fluid flow regulator which comprises a tubular (e.g., cylindrical) housing defining a passage for the flow of a fluid medium (e.g., air) in a predetermined direction substantially axially of the housing, shaft means mounted in the housing and defining a pivot axis which extends substantially diametrically of the passage, a valving element (e.g., a flap consisting of sheet metal or the like) which is mounted on the shaft means in the passage and includes two mutually inclined sections turnable by the fluid medium as a unit about the axis of the shaft means between spaced apart first and second end positions in which the valving element respectively permits and prevents the flow of fluid medium through the passage, and a diaphragm or other suitable means for restricting the flow of fluid medium in the passage upstream of the valving element (as considered in the direction in which the fluid medium flows through the housing when the valving element is not held in the second end position). The flow restricting means defines one or more channels whose combined cross-sectional area is less than the cross-sectional area of the passage and which direct one or more streams of fluid medium against one or more selected portions of or against the entire valving element, dependin upon whether the valving element extends across the entire passage or across a portion of the passage. The valving element is preferably of the type wherein one section is substantially parallel to the axis of the housing in one end position and the other section is substantially normal to the axis of the housing in the other end position of the valving element.

Each channel preferably extends substantially transversely of the axis of the shaft means, and the width of each channel, as considered in the axial direction of the shaft means, is preferably less than the inner diameter of the housing. If the flow restricting means defines a single channel, such channel can extend transversely across the entire housing. Alternatively, the channel may be disposed at one side of the axis of the shaft means. For example, if the flow restricting means is a diaphragm which defines two discrete channels, one of the channels can be disposed at one side of the axis of the shaft means and the other channel is then disposed at the other side of such axis. In this manner, each channel directs a fluid stream against a different section of the pivotable valving element.

It is further within the purview of the invention to employ flow restricting means whose channel or channels diverge transversely of the direction of fluid flow in the housing, i.e., the cross-sectional area of one or more channels can vary, as considered at right angles to the direction of fluid flow.

The novel features which are considered as characteristic of the invention are set forth in particular in the appended claims. The improved fluid flow regulator itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
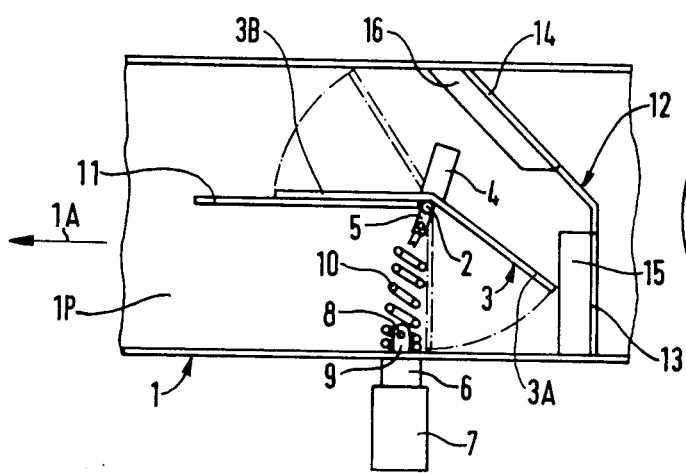
FIG. 1 is a fragmentary axial sectional view of a fluid flow regulator which embodies one form of the invention and wherein the flow restricting means defines several discrete channels for the flow of fluid streams toward the valving element.

The fluid flow regulator of FIGS. 1 and 2 comprises a tubular housing or duct 1 of circular cross-sectional outline. The end portions (not shown) of the housing 1 can be provided with suitable circumferential beads or other stops which determine the extent to which such end portions can be inserted into two spaced-apart coaxial sections of a pipeline (not shown) for a fluid medium, e.g., air, another gas or a liquid. A transverse shaft 2 is mounted in the interior of the housing 1. The end portions of this shaft extend into bearings which are provided therefor on the housing 1, and the axis of the shaft 2 is offset with respect to the axis of the housing 1, preferably by approximately 3 percent as compared with the length of the inner diameter of the housing. Bearings which are suitable for use in the fluid flow regulator of the present invention are disclosed in my U.S. Pat. No. 4,124,037.

The shaft 2 mounts a substantially V-shaped valving element or flap 3 having two mutually inclined sections or panels 3A and 3B which make an angle of approximately 150 degrees. The direction of fluid flow through the passage 1P of the housing 1 is indicated by the arrow 1A. Th flap 3 carries at least one but preferably two cylindrical counterweights 4 so that its gravity line is located on the axis of the shaft 2 which is connected with the flap 3 in the region where the sections 3A and 3B meet. The shaft 2 rotates with the flap 3, and the latter is further connected with a lever arm 5 which is disposed substantially or exactly midway between the ends of the shaft 2 and extends from that side of the flap 3 where the downstream sides of the sections 3A and 3B make an angle of approximately 150 degrees.

The housing 1 supports an externally threaded sleeve or nipple 6 which is secured to the exterior of the housing opposite the lever arm 5 and whose external threads mesh with a removable and adjustable internally threaded cap 7. The latter seals the outer end of the nippe 6 and has a projection or stud 9 which extends through the nipple, through a hole (not shown) in the housing 1 and into the interior of the housing toward the lever arm 5. The inner end portion of the nipple 6 is sealingly secured to the exterior of the housing 1 so that it prevents leakage of any fluid through the hole for the stud 9. That portion of the stud 9 which extends into the housing 1 has a diametrically extending transverse pin 8. A helical spring 10 is mounted on the stud 9 in such a way that one or more of its outer end convolutions extend outwardly beyond the pin 8. The innermost convolution of the spring 10 is attached to an eyelet or hook (not specifically shown) of the lever arm 5. By rotating the cap 7, an operator can adjust the effective length of the spring 10. This spring biases the flap 3 to the end position which is shown in FIG. 1 by solid lines, i.e., in which one side of the section 3B abuts against the adjacent side of a disk-shaped partition 11 which is inserted into and is located centrally of the housing 1 downstream of the shaft 2. The other section 3A of the flap 3 then extends counter to the direction of fluid flow (arrow 1A) and makes with the axis of the housing an angle of approximately 30 degrees. The downstream end of the partition 11 is preferably of semicircular outline. When the fluid stream in the housing 1 flows at a rate or is maintained under a pressure such that the flap 3 is moved to the other end position which is shown by broken lines, the section 3B makes with the plane of partition 11 an angle of approximately 60 degrees and its marginal portion sealingly engages the inner surface of the upper half of the housing 1, as viewed in FIG. 1. At the same time, the section 3B makes a right angle with the axis of the housing 1 and its marginal portion sealingly engages the inner surface of the lower half of the housing, as viewed in FIG. 1. Thus, the section 3B then extends at an oblique angle to the axis of the housing 1 and forwardly, as considered in the direction of arrow 1A.

The purpose of the flap 3 is to insure that the quantity of fluid which flows through the housing 1 remains constant even if the pressure of inflowing fluid changes. As the pressure of fluid against the section 3A increases, the flap 3 pivots from the solid-line position toward the broken-line position to thereby reduce the effective cross-sectional area of the passage 1P in the housing 1. Pivoting of the flap 3 toward the broken-line position takes place against the opposition of the spring 10 which tends to maintain the section 3B in contact with the partition 11. The purpose of the partition 11 is to reduce the likelihood of turbulence behind the section 3A of the flap 3. Reference may be had to the aforementioned U.S. Pat. No. 4,124,037.

The heretofore described parts of the regulator are similar or analogous to those described in commonly owned U.S. Pat. Nos. 3,965,928, 3,996,961 and 4,124,037.

Figure 2A:
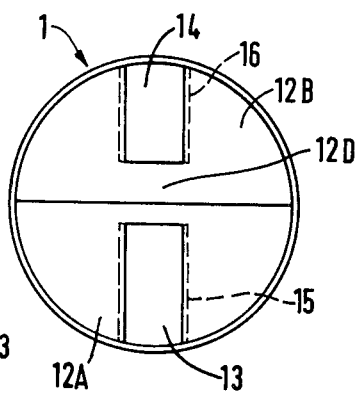
FIGS. 2a and 2b are end elevational views as seen from the right-hand side of FIG. 1.
Figure 2B:
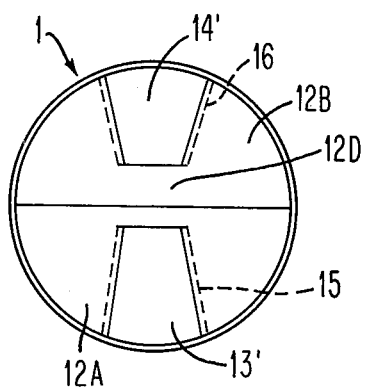

In accordance with a feature of the present invention, the effective cross-sectional area of the passage 1P for the flow of fluid in the housing 1 is regulated by the flap 3 as well as by a flow restricting diaphragm 12 which is installed in the housing 1 upstream of the flap 3. The diaphragm 12 includes two mutually inclined panels 12A and 12B whose inclination is similar to that of the sections 3A, 3B when the flap 3 is held in the broken-line position of FIG. 1. The panel 12A shown in FIG. 2a has an aperture 13 of a substantially constant width which extends radially and all the way to the internal surface of the lower half of the housing 1, as viewed in FIGS. 1 or 2a. An aperture 14 of the panel 12B of FIG. 2a is substantially mirror symmetrical to the aperture 13 with reference to the plane of the partition 11 and extends to the internal surface of the upper half of the housing 1. It will be noted that the aperture 13 is located in a plane which is substantially normal to the axis of the housing 1, and that the aperture 14 is located in a plane which slopes forwardly, as considered in the direction of fluid flow (arrow 1A). Thus, the aperture 13 directs fluid against the section 3A, and the aperture 14 directs fluid against the section 3B (provided that the section 3B is not held in the solid-line position of FIG. 1). The width of the apertures 13 and 14 equals or approximates one-fifth of the inner diameter of the housing 1. The width of the web 12D between the innermost portions of the apertures 13, 14 also equals or slightly exceeds one-fifth of the inner diameter of the housing 1. The diaphragm 12 further comrpises pairs of side walls 15, 16 which constitute plates and extend downstream of the panels 12A and 12B and flank the respective apertures 13 and 14. This insures that the diaphragm 12 permits two condensed streams of fluid (e.g., air) to pass therethrough. The side walls 15 and 16 define two short channels which direct fluid streams against the corresponding sections 3A and 3B of the flap 3.

It will be noted that, instead of allowing the oncoming fluid to impinge upon the entire upstream side of the flap 3, the improved fluid flow regulator comprises means for restricting the cross-sectional area of the passage 1P in the housing 1 to two channels (between the side walls 15 and 16) wherein the streams of fluid can flow toward and impinge upon the respective sections 3A and 3B of the flap 3. The velocity of the fluid streams which flow through the two channels is increased proportionally to reduction of the cross-sectional area of the housing 1 by the diaphragm 12. The positions of the apertures 13 and 14 are such that the respective fluid streams impinge upon the outer portions of the corresponding flap sections 3A and 3B, i.e., in regions which are spaced apart from the shaft 2.

An important advantage of the improved fluid flow regulator is that its sensitivity is enhanced in a simple and inexpensive way, i.e., by the provision of the flow restricting diaphragm 12 upstream of the valving element or flap 3. The channels which are defined by the diaphragm 12 direct concentrated streams of fluid medium against selected portions of the sections 3A and 3B to thus insure that the angular position of the flap 3 will change (either under the action of the spring 10 or under the action of fluid flowing through the channels which are bounded by the side walls 15 and 16) in response to minute changes of the speed of fluid which enters the right-hand end of the passage 1P, as viewed in FIG. 1. The speed of fluid which enters the channels via apertures 13 and 14 increases because the combined cross-sectional area of the apertures 13 and 14 is appreciably less than the cross-sectional area of the passage 1P. Consequently, the impulse which is generated by a given quantity of fluid is much higher than in the absence of the diaphragm 12, and the kinetic energy of fluid streams flowing in the channels between the side walls 15 and 16 is the square of kinetic energy of the fluid in the absence of the diaphragm 12. Since the kinetic energy of the fluid determines the force which is applied to the flap 3 in a direction to move the latter toward the closed position, the diaphragm 12 insures that the flap 3 reacts and changes the effective cross-sectional area of the passage 1P under circumstances which are not conducive to a change of the angular position of the flap in heretofore known fluid flow regulators. Consequently, the upper limit of the rate of fluid flow through the regulator can be reduced without affecting the sensitivity of the regulator. This means that the improved regulator can be used under circumstances where the upper limit of the rate of fluid flow is rather low (e.g., in fans of the aforediscussed type) and is neither expected nor intended to exceed a relatively low rate of flow.

Th provision of a diaphragm whose panels are mutually inclined in a manner resembling or matching the mutual inclination of sections 3A, 3B of the flap 3 is desirable and advantageous because, when the flap 3 is held in the end position which is indicated by broken lines, the distance between the aperture 13 and the section 3A approximates or equals the distance between the aperture 14 and the section 3B. Thus, neither of the two sections of the flap 3 is too remote from the respective channel.

The flow regulator of FIGS. 1 and 2 can be modified in a number of ways without departing from the spirit of the invention. For example, the flow restricting means may consist of two branches of the housing 1 which direct streams of fluid against the sections 3A and 3B of the flap. Furthermore, the side walls 15, 16 can be replaced by conduits which are installed in the passage 1P intermediate the apertures 13, 14 of the diaphragm 10 and the corresponding sections of the flap 3. The provision of channels which are defined by the diaphragm 12 and/or by parts which are secured to the diaphragm 12 is preferred at this time because this insures more satisfactory concentration of fluid streams upon the selected parts of the sections 3A and 3B.

It will be readily appreciated that the locations of impingement of fluid streams, which flow in the channels between the side walls 15 and 16, upon the sections 3A and 3B of the flap vary in response to changes of angular position of the flap 3. For example, the fluid stream which flows through the aperture 14 will bypass the section 3B in the fully open position of the flap 3, and a relatively small portion of the fluid stream flowing through the aperture 13 will impinge upon the section 3A. The area of the section 3A which is acted upon by the lower fluid stream of FIG. 1 increases as the flap 3 pivots from the solid-line toward the broken-line position of FIG. 1. It is also possible to resort to a more complex flow restricting means which is designed to insure that each fluid stream impinges upon one and the same portion of the respective section in each and every angular position of the flap 3 or, otherwise stated, that the area of impingement of fluid streams upon the sections 3A and 3B remains unchanged regardless of the angular position of the flap 3.

The concentration of fluid streams upon selected portions of the flap 3 need not be very pronounced. In other words, it is not necessary to design the flow restricting means in such a way that there is a pronounced boundary between those portions of surfaces of the sections 3A and 3B which are acted upon by the concentrated fluid streams and the remaining portions of the respective sections 3A and 3B. It has been found that the achievement of such pronounced boundaries is not only more expensive but is not necessary in order to achieve appreciable improvements in sensitivity of the fluid flow regulator. All that counts is to insure that the speed of fluid which impinges upon certain portions of the flap 3 is higher than the speed of fluid which contacts the remaining portions of the rear sides of the sections 3A and 3B.

The apertures 13 and 14 of the diaphragm 12 confine the flow of fluid whose velocity is increased as a result of the provision of the diaphragm 12 to a relatively small portion of the cross-sectional area of the passage 1P. Such portions are disposed in the vertically extending central part of the passage 1P, as viewed in FIG. 2, and the two fluid streams flow at the opposite sides of the axis of the shaft 2. Thus, the two channels between the side walls 15 and 16 extend transversely of the shaft 2 and are located at the opposite sides of this shaft. The web 12D between the apertures 13 and 14 can be omitted, i.e., the two channels can be replaced by a single channel which extends diametrically of the housing 1 at right angles to the shaft 2. It has been found that the provision of two discrete channels is often desirable and advantageous because the fluid streams act upon the respective sections 3A and 3B at locations which are remote from the shaft 2. This results in an increase of the torque which is applied to the flap 3 in a direction to move between its two end positions. Those portions of the streams which are nearer to the shaft 2 act upon the respective sections 3A and 3B (or at least upon the section 3A) in each and every angular position of the flap 3. The stream portions which are nearer to the internal surface of the housing 1 act upon the respective sections only when the flap 3 is near to or assumes the end position which is indicated by broken lines. This feature, namely, that the area of contact between the fluid streams and the respective sections 3A and 3B of the flap 3 increases as the flap 3 moves toward the closed position, renders it possible to influence the characteristic curve of the fluid flow regulator. For example, and assuming that the force with which the fluid acts upon the flap 3 in order to insure a constant rate of fluid flow past and beyond the flap 3 must increase as the flap 3 moves toward the closed position (this is due to the provision of spring 10 whose resistance to pivoting of the flap 3 in a clockwise direction, as viewed in FIG. 1, increases while the flap 3 moves away from the solid-line position), one can insure a constant rate of fluid flow by increasing the width of the channels in a direction toward the internal surface of the housing 1, as indicated at 13' and 14' in FIG. 26. Under certain other circumstances, it may be advantageous to employ a diaphragm which defines channels whose width decreases in a direction from the shaft 2 toward the internal surface of the housing 1. This modificaton will be resorted to if the flap 3 is biased in such a way that its resistance to angular movement decreases while the sections 3A and 3B move from the solid-line toward the broken-line positions. As a rule, it suffices to provide the diaphragm 12 with apertures 13, 14 of a constant width, as considered in the axial direction of the shaft 2, as shown in FIG. 2a, i.e., it is not absolutely necessary to provide channels whose cross-sectional area varies, either in the direction of fluid flow or at right angles to such direction. Moreover, the cost of manufacturing a diaphragm with apertures 13, 14 of constant width is lower.

Figure 3:
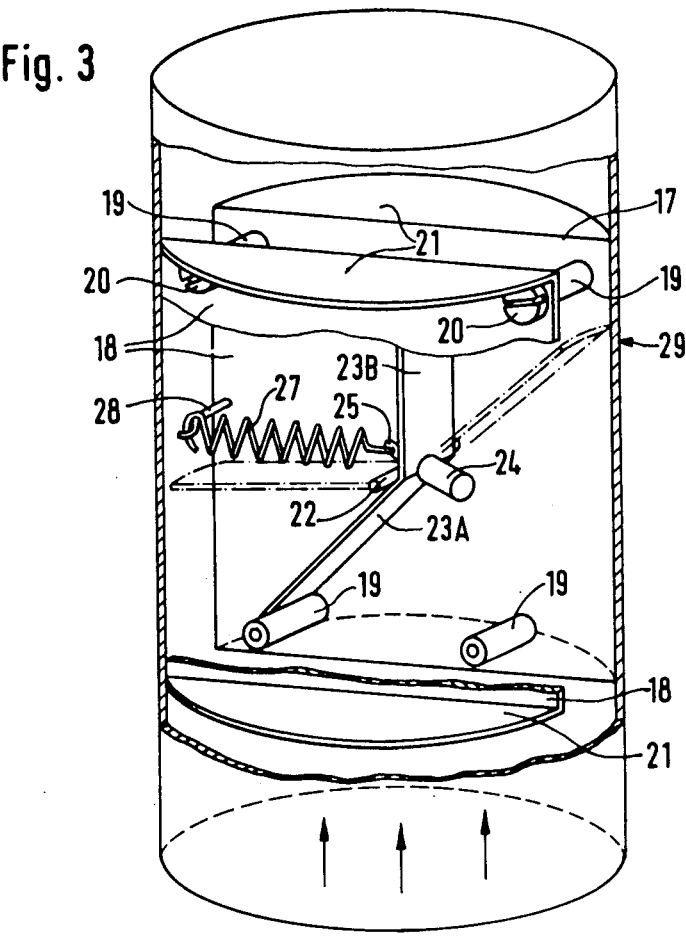
FIG. 3 is a perspective view of a modified fluid flow regulator with a portion of the housing and with portions of the flow restricting means being broken away.
Figure 4:
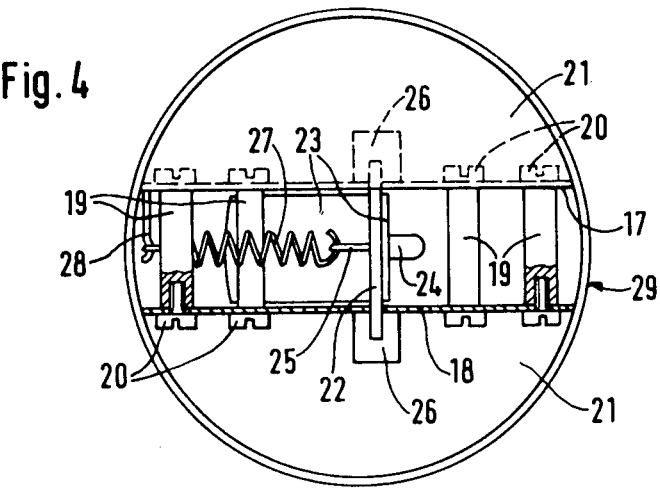
FIG. 4 is an end elevational view of the modified fluid flow regulator, with portions of the flow restricting means in the housing being broken away.

The fluid flow regulator of FIGS. 3 and 4 differs from the previously described regulator in that the pivotable valving element or flap 23 is mounted in a channel which is defined by a modified flow restricting device. Thus, instead of employing a diaphragm upstream (in immediate or close proximity) of the flap, the fluid flow regulator of FIGS. 3 and 4 defines a single channel wherein the fluid flows toward, past and beyond the flap 23 when the latter is held in the fully or partly open position.

The cylindrical housing 29 of the fluid flow regulator of FIGS. 3 and 4 contains a frame 17 which is fully assembled outside of the housing 29 and all parts of which can be simultaneously introduced into or removed from the passage which is defined by the housing 29. The frame 17 comprises two mirror symmetrical sheet metal plates 18 which are parallel to and are disposed at the opposite sides of the axis of the housing 29. The plates 18 are held apart by distancing elements 19 which are secured to both plates by screws 20 or analogous means. These plates perform the function of side walls 15 or 16 of the diaphragm 12 of FIGS. 1 and 2, i.e., they define a channel which extends across the entire passage of the housing 29. In addition, the side walls or plates 18 support the shaft 22 for the flap 23 which is analogous to but narrower than the flap 3. The two mutually inclined sections of this flap are respectively shown at 23A and 23B. The upstream and downstream end portions of the plates 18 are bent outwardly, as at 21, so as to insure that the oncoming fluid can flow only through the channel wherein the flow of fluid is regulated by the flap 23. The outwardly bent end portions 21 of the plates 21 are substantially semicircular and can sealingly engage the internal surface of the housing 29 to prevent uncontrolled leakage of fluid along the internal surface of the housing. The two upstream end portions 21 may be said to constitute a diaphragm whose portions or plates 18 define the channel for the flow of fluid from the upstream side toward and beyond the downstream side of the frame 17.

The axis of the shaft 22 is slightly offset with respect to the axis of the housing 29, e.g., by approximately 3 percent. The end portions of the shaft 22 extend through and beyond the plates 18 and are rotatable in suitable thrust bearings 26 (indicated in FIG. 4 by broken lines) which are mounted at the outer sides of the plates 18. The shaft 22 turns with the flap 23. The angle between the sections 23A and 23B is approximately 150 degrees, i.e., the plane of the section 23A and the extension of the plane of the section 23B make an angle of 30 degrees or thereabout. A counterweight 24 on the section 23A and/or 23B insures that the gravity line of the flap 23 is located on the axis of the shaft 22. The latter is connected with the flap 23 in the region where the sections 23A and 23B meet. The median portion of the shaft 22 is connected with a lever 25 which is further connected to the nearest convolution of a helical spring 27 anchored on a retainer or post 28 of the housing 29 and tending to maintain the flap 23 in the fully open position which is indicated by solid lines. The retainer 28 can also be mounted on one of the plates 18 (this is actually shown in FIGS. 3 and 4).

The partition 11 of FIG. 1 is omitted. When the flap 23 is held in the solid-line position of FIG. 3, its section 23A abuts against one of the upstream distancing elements 19. To this end, the two upstream distancing elements 19 are mounted nearer to each other than the two downstream distancing elements. The downstream distancing elements 19 are located close to the internal surface of the housing 29, i.e., close to the downstream corners of the substantially square or rectangular plates 18. When the flap 23 is moved to the other end position (shown in FIG. 3 by broken lines), its section 23B abuts against the internal surface of the housing 29, the same as the section 23A. The flap 23 then seals the channel between the inner sides of the plates 18 against the flow of any fluid therethrough. It is clear that one or both plates 18 can be provided with stops (not shown) which arrest the flap 23 in the solid-line and/or broken-line position. For example, the retainer 28 can be positioned or configurated in such a way that it serves as an abutment or stop for the section 23A in the broken-line end position of the flap 23. The portions 21 of the frame 17 are secured to the housing 29 in any suitable way to insure that the frame 17 is held against axial and preferably also against angular movement in the housing 29.

The advantages of the fluid flow regulator of FIGS. 3 and 4 are similar to those of the regulator of FIGS. 1 and 2. Thus, the upstream end portions 21 and the plates 18 define a channel wherein the oncoming fluid flows against the corresponding sections 23A and 23B of the flap 23. In this embodiment of the invention, the flap 23 is relatively narrow, i.e., its maximum width does not equal or approximate the inner diameter of the housing 29 but rather only the width of the channel between the inner sides of the plates 18. Therefore, a single channel can admit fluid against the entire upstream sides of the sections 23A and 23B.

The frame 17 with the two spaced apart inserts (each such insert includes a first portion or plate 18 and two end portions 21) constitutes a modified flow restricting device which replaces the diaphragm 12 of FIGS. 1 and 2. The two inserts are mirror symmetrical to each other with reference to a plane which includes the axis of the housing 29 and extends between the plates 18. The width of the flap 23 is slightly less than the distance between the plates 18 in order to insure that the sections 23A and 23B can be readily moved between the solid-line and broken-line positions.

The frame 17 can be assembled with the flap 23 and marketed as a self-supporting unit which can be installed in existing housings, e.g., pipes consisting of asbestos cement. Thus, it is not necessary to employ the just discussed unit solely in fluid flow regulators wherein the rate of fluid flow is relatively low and the pressure of fluid which flows through the housing is also low. The self-sustaining unit can be inserted into housings having a pronounced or minimal wall thickness. For example, such self-sustaining unit can be inserted into the discharge end of a vent pipe which conveys air from a toilet, a kitchen, a bath or another room which requires frequent and pronounced recirculation of air. The unit can be inserted or removed (e.g., for inspection, cleaning or repair) by semiskilled or unskilled persons and, if necessary, replaced with an intact unit. If desired, the self-sustaining unit can be provided with a screen or grating, with a ring or with other suitable means which facilitate insertion and retention in an optimum position. Still further, a grating or screen can be inserted downstream of a properly inserted frame 17.

Each of the two inserts which form part of the frame 17 can be made of sheet metal which is bendable so as to allow for flexing of the end portions 21 radially outwardly of the respective ends of the plates 18. The inner sides of the plates 18 flank the channel which accommodates the flap 29 and conveys a condensed stream of fluid in a direction toward the rear sides of the sections 23A and 23B. The outer sides of the plates 18 support the respective bearings 26 for the corresponding end portions of the shaft 22. Such bearings are protected because they are disposed between the respective pairs of end portions 21.

The frame 17 defines a single channel which extends transversely of the axis of the shaft 22 and all the way to the internal surface of the housing 29. The width of such channel is a fraction of the inner diameter of the housing 29. The length of the sections 23A and 23B depends on the inner diameter of the housing 29.

The fluid flow regulator of FIGS. 3 and 4 can be modified in a number of ways. For example, the regulator can also comprise flow restricting means which defines one or more channels whose width varies in a direction from the inner surface of the housing 29 toward the axis of the shaft 22. The configuration of plates 18 can be selected in such a way that the width of the channel increases from the marginal portions of the plates 18 (i.e., from the internal surface of the housing 29) toward the shaft 22. The provision of one or more channels whose width increases in the opposite direction can be achieved at a lower cost by resorting to flow restricting means in the form of a diaphragm. The features of the flow restricting means of FIGS. 1–2b and 3–4 can be combined in one and the same fluid flow regulator.

The housing 1 or 29 can have a polygonal cross-sectional outline.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

The restriction of the passage to a cross-sectional area extending transversely of the axis and having a width which is less than the inner diameter of said housing and is extending only in a middle region thereof will in case of a circular cross section of the housing increase the arm of the lever of the force acted upon the valving element by the fluid stream, on an average or on the whole, the distance of the flap areas from the pivot axis is increased.

I claim:

1. A fluid flow regulator, comprising a tubular housing defining a passage for the flow of a fluid medium in a predetermined direction; shaft means mounted in said housing and defining a pivot axis extending substantially diametrically of said passage; a valving element mounted on said shaft means in said passage, said element including two mutually inclined sections and being turnable by the fluid medium between spaced apart first and second end positions in which said element respectively permits and prevents the flow of fluid medium through said passage, one of said sections being substantially parallel to the axis of said housing in one end position and the other of said sections being substantially normal to the axis of said housing in the other end position of said valving element; and means for restricting the flow of fluid medium in said passage upstream of said valving element, as considered in said direction, said flow restricting means defining at least one channel whose cross-sectional area is less than the cross-sectional area of said passage and which directs at least one stream of fluid medium against said valving element.

2. The fluid flow regulator of claim 1, wherein said channel extends substantially transversely of said axis and the width of said channel, as considered in the direction of said axis, is less than the inner diameter of said housing.

3. The fluid flow regulator of claim 2, wherein said channel is located at one side of said axis.

4. A fluid flow regulator for regulating the flow of a fluid medium in a predetermined direction through a passage of a tubular element, comprising two inserts; distancing means disposed between said inserts and spacing the same from one another to define a channel therebetween; fastener means for securing said distancing means to said inserts; shaft means mounted on said inserts and defining a pivot axis; and a valving element mountd on said shaft means and flanked by said inserts, said element being turnable by the fluid medium between spaced apart first and second end positions in which said element respectively permits and considerably hinders if not fully prevents the flow of fluid medium through said passage, said inserts, said distancing elements, said fastener means, said shaft and said valving element constituting a self-supporting unit which is insertable into and withdrawable from said passage.

5. A fluid flow regulator, comprising a tubular housing defining a passage for the flow of a fluid medium in a predetermined direction; shaft means mounted in said housing and defining a pivot axis extending substantially diametrically of said passage; a valving element mounted on said shaft means in said passage, said element including two mutually inclined sections and being turnable by the fluid medium between spaced apart first and second end positions in which said element respectively permits and at least substantially prevents the flow of fluid medium through said passage; and means for restricting the flow of fluid medium in said passage upstream of said valving element, as considered in said direction, said flow restricting means defining at least one channel which directs at least one stream of fluid medium against said valving element, the cross-sectional area of said channel being less than the cross-sectional area of said passage and such that the fluid medium flowing through said channel in said direction impinges only upon a portion of at least one of said sections of said valving element.

6. The fluid flow regulator of claim 5, wherein said flow restricting means comprises a diaphragm installed in said housing upstream of said valving element, said diaphragm having at least one aperture which directs the fluid medium against said valving element.

7. The fluid flow regulator of claim 6, wherein said diaphragm comprises two mutually inclined panels one of which is substantially parallel to one of said sections and the other of which is substantially parallel to the other of said sections in one of said end positions of said valving element.

8. The fluid flow regulator of claim 6, wherein said diaphragm further comprises side walls flanking said aperture and bounding said channel.

9. The fluid flow regulator of claim 8, wherein the cross-sectional area of said channel is substantially rectangular.

10. A fluid flow regulator, comprising a tubular housing defining a passage for the flow of a fluid medium in a predetermined direction; shaft means mounted in said housing and defining a pivot axis extending substantially diametrically of said passage; a valving element mounted on said shaft means in said passage, said element including two mutually inclined sections and being turnable by the fluid medium between spaced apart first and second end positions in which said element respectively permits and prevents the flow of fluid medium through said passage; and means for restricting the flow of fluid medium in said passage upstream of said valving element, as considered in said direction, said flow restricting means including two spaced apart inserts in said passage flanking said valving element and defining at least one channel which is disposed between said inserts, whose cross-sectional area is less than the cross-sectional area of said passage, and which directs at least one stream of fluid medium against said valving element.

11. The fluid flow regulator of claim 10, wherein said inserts comprises plates which are parallel and substantially mirror symmetrical to each other with reference to a plane including the axis of said housing.

12. The fluid flow regulator of claim 10, wherein said flow restricting means further comprises distancing means disposed between said inserts and fastener means for securing said distancing means to said inserts, said inserts, said distancing elements and said fastener means constituting a self-supporting unit which is insertable into and withdrawable from said passage.

13. The fluid flow regulator of claim 10, wherein each of said inserts comprises a plate-like first portion adjacent to the respective side of said valving element and an end portion located upstream of said valving element and extending radially outwardly from the respective first portion into engagement with the internal surface of said housing.

14. The fluid flow regulator of claim 13, wherein each of said inserts further comprises a second end portion located downstream of said valving element and extending radially outwardly into engagement with the internal surface of said housing.

15. The fluid flow regulator of claim 13, wherein said first portions of said inserts have inner sides bounding said channel and outer sides, said shaft means extending through said first portions and further comprising bearing means for said shaft means, said bearing means being mounted at the outer sides of said first portions.

16. A fluid flow regulator, comprising a tubular housing defining a passage for the flow of a fluid medium in a predetermined direction; shaft means mounted in said housing and defining a pivot axis extending substantially diametrically of said passage; a valving element mounted on said shaft means in said passage, said element including two mutually inclined sections and being turnable by the fluid medium between spaced apart first and second end positions in which said element respectively permits and prevents the flow of fluid medium through said passage; and means for restricting the flow of fluid medium in said passage upstream of said valving element, as considered in said direction, said flow restricting means defining at least one channel whose cross-sectional area is less than the cross-sectional area of said passage and varies as considered transversely of said direction, and which directs at least one stream of fluid medium against said valving element.

17. A fluid flow regulator, comprising a tubular housing defining a passage for the flow of a fluid medium in a predetermined direction; shaft means mounted in said housing and defining a pivot axis; a valving element mounted on said shaft means in said passage, said element being turnable by the fluid medium between spaced apart first and second end positions in which said element respectively permits and considerably hinders if not fully prevents the flow of fluid medium through said passage; and means for restricting the flow of fluid medium in said passage upstream of said valving element, as considered in said direction, said flow restricting means including two spaced apart inserts in said passage flanking said valving element and defining at least one channel which is disposed between said inserts, whose cross-sectional area is less than the cross-sectional area of said passage, and which directs at least one stream of fluid medium against said valving element.

* * * * *